United States Patent [19]
Tomita

[11] Patent Number: 5,615,487
[45] Date of Patent: Apr. 1, 1997

[54] SIGHT SCOPE

[75] Inventor: Saburo Tomita, Fujimi, Japan

[73] Assignee: Asia Optical Co., Ltd., Japan

[21] Appl. No.: 518,331

[22] Filed: Aug. 23, 1995

[30] Foreign Application Priority Data

Aug. 24, 1994 [JP] Japan ............................ 6-222515

[51] Int. Cl.$^6$ ........................................ F41G 1/38
[52] U.S. Cl. ............................... 33/245; 33/248
[58] Field of Search ........................... 33/245, 246, 247, 33/248, 233; 359/399, 425, 426, 427, 428; 356/247

[56] References Cited

U.S. PATENT DOCUMENTS

| | | | |
|---|---|---|---|
| 2,948,188 | 8/1960 | Kollmorgen | 33/246 |
| 2,955,512 | 10/1960 | Kollmorgen et al. | 33/247 |
| 3,161,716 | 12/1964 | Burris et al. | 33/246 |
| 3,336,831 | 8/1967 | Unertl, Jr. | 33/247 |
| 4,255,013 | 3/1981 | Allen | 33/247 |

FOREIGN PATENT DOCUMENTS

59-94318  6/1984  Japan .

*Primary Examiner*—G. Bradley Bennett
*Attorney, Agent, or Firm*—Evenson, McKeown, Edwards & Lenahan P.L.L.C.

[57] ABSTRACT

In a sight scope, an erect sleeve is received in a scope body. An erect lens system is disposed within the erect sleeve. An erect lens system is pivotably supported at its end portion on the side of an eye piece by the scope body. The other end portion of the erect sleeve on the side of an objective is biased by a spring so as to contact an inner end face of an adjusting member of an inclination adjusting mechanism. The end portion of the erect sleeve on the side of the objective is moved by the adjusting member in a direction perpendicular to an axis of the scope body. By this, the erect sleeve is adjusted in its angle of inclination with respect to the axis of the scope body. A projection is formed on that end portion of the erect sleeve on the side of the objective. The projection is tapered when viewed in a direction perpendicular to the axis of the scope body. A top portion of this project is in contact with the inner end face of the adjusting member.

14 Claims, 6 Drawing Sheets

SIGHT SCOPE

BACKGROUND OF THE INVENTION

This invention relates to a sight scope used for a rifle gun, an archery and the like.

In general, a sight scope includes a sleeve-like scope body. This scope body has an objective lens system at a front end portion thereof and an eyepiece lens system at a rear end portion thereof. An erect sleeve is received in the scope body. An erect lens system is disposed within the erect sleeve so that the shooter can see a target as an erect image.

As disclosed in Japanese Laid-Open Utility Model Application No. Sho 59-94318, the erect sleeve is inclinably supported at its end portion on the side of the eye piece. The erect sleeve is inclined upwardly and downwardly with respect to the axis of the scope body by an inclination adjusting mechanism, depending on a distance from the shooter to the target. Consequently, the target image is adjusted in relative position with respect to a reticle image. Also, this inclination adjusting mechanism is operated to incline the erect sleeve rightwardly and leftwardly depending on intensity of wind power.

The inclination adjusting mechanism comprises an adjusting member threadedly engaged with a scope body and a spring for biasing that end portion of the erect sleeve which is located on that side of the objective lens, so that the elect sleeve is brought into abutment with an inner end of the adjusting member. The inner end of the adjusting member is defined as a flat surface, while an outer peripheral surface of that end portion of the erect lens which is located on the side of the objective lens, is defined as a cylindrical surface.

Figure 8A:
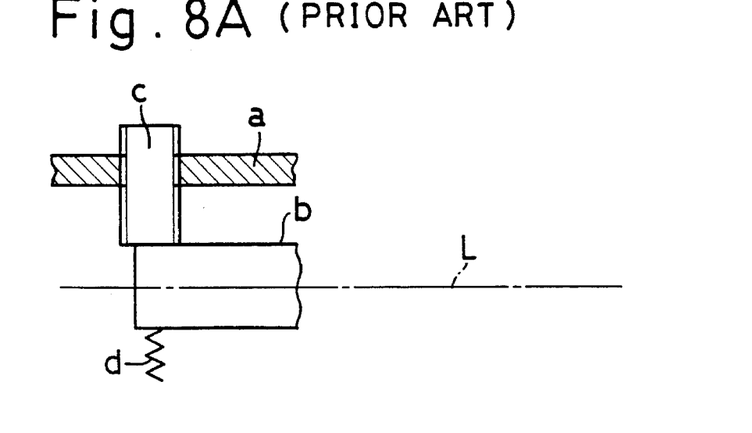
FIG. 8A is a schematic side view of a conventional inclination adjusting mechanism in which an erect sleeve is coaxial with a scope body.
Figure 8B:
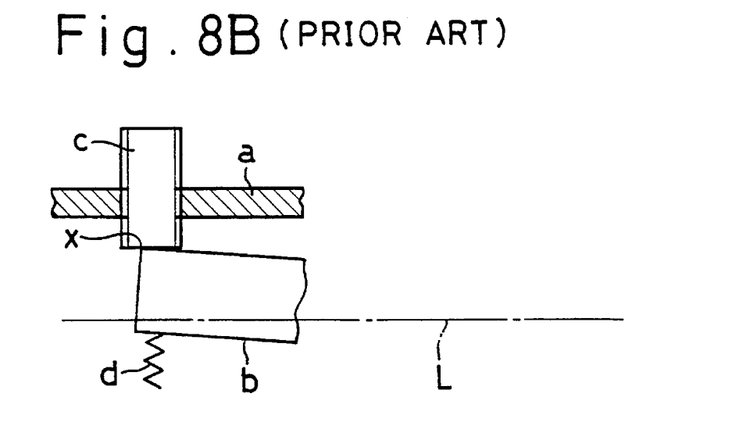
FIG. 8B is a side view of the conventional inclination adjusting mechanism in which the erect sleeve is in its upwardly inclined state.
Figure 8C:
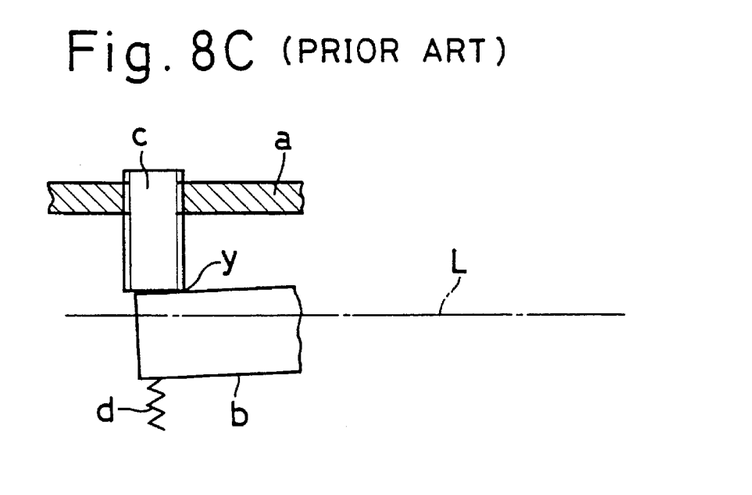
FIG. 8C is a side view of the conventional inclination adjusting mechanism in which the erect sleeve is in its downwardly inclined state.

The shortcomings of the inclination adjusting mechanism thus constructed will be described with reference to FIGS. 8A, 8B and 8C. In those illustrations, a peripheral wall of the scope body is represented by reference numeral a; the erect sleeve, by b; the adjusting member, by c and an axis of the scope body a, by L, respectively. As shown in FIG. 8A, when the adjusting member c is in a neutral position, the erect sleeve b is coaxial with the scope body a. Consequently, an inner end face of the adjusting member c is in line-contact with the scope body a along the axis L. As shown in FIG. 8B, when the adjusting member c is in a retreated position with respect to the scope body a, the erect sleeve b is inclined upwardly. Consequently, the adjusting member c is in contact with the erect sleeve b at a point x. In contrast, as shown in FIG. 8C, when the adjusting member c is inserted deep into the scope body a, the erect sleeve b is inclined downwardly. Consequently, the adjusting member c is in contact with the erect sleeve b at a point y. In this way, if the inclination direction of the erect sleeve b is different, the erect sleeve b and the adjusting member c are in contact with each other but at a different contacting point. Accordingly, a distance between a pivotal point of the erect sleeve b and the contacting point is varied. As a consequence, a relation between an amount of axial movement (in other words, an amount of pivotal operation) of the adjusting member c and an angle of inclination of the erect sleeve b is varied depending on the inclination direction of the erect sleeve b. The reason is that the angle of inclination is determined by the distance between the pivotal point of the erect sleeve b and the contacting point and the amount of movement of the adjusting member c.

SUMMARY OF THE INVENTION

It is, therefore, an object of the present invention to provide a sight scope in which a relation between an amount of axial movement of an adjusting member and an inclination angle of an erect sleeve can be made equal in two mutually opposite inclination directions of the erect sleeve and eventually, an angle of inclination of the erect sleeve can be adjusted correctly.

According to the present invention, there is provided a sight scope comprising:

(a) a sleeve-like scope body having an objective lens system on a front end portion thereof and an eyepiece lens system on a rear end portion thereof;

(b) an erect sleeve received in the scope body, an erect lens system being supported within the erect sleeve, one end portion of the erect sleeve being pivotably supported by the scope body; and (c) inclination adjusting means for inclining the erect sleeve with respect to an axis of the scope body by moving the other end portion of the erect sleeve in a direction perpendicular to the axis of the scope body, the inclination adjusting means including an adjusting member and a spring, the adjusting member extending through the scope body in such a manner as to be perpendicular to the axis of the scope body and being threadedly engaged with the scope body, the spring being adapted to bias the other end portion of the erect sleeve so as to be brought into abutment with an inner end face of the adjusting member, thereby the inclination of the erect sleeve being determined by the adjusting member;

(d) one of the inner end face of the adjusting member and an outer peripheral surface of the other end portion of the erect sleeve being provided as a first surface and the other, as a second surface, a projection being formed on the first surface, the projection being tapered when viewed in a direction perpendicular to the axis of the scope body, a top portion of the projection being in contact with the second surface.

DETAILED DESCRIPTION OF THE INVENTION

Figure 1:
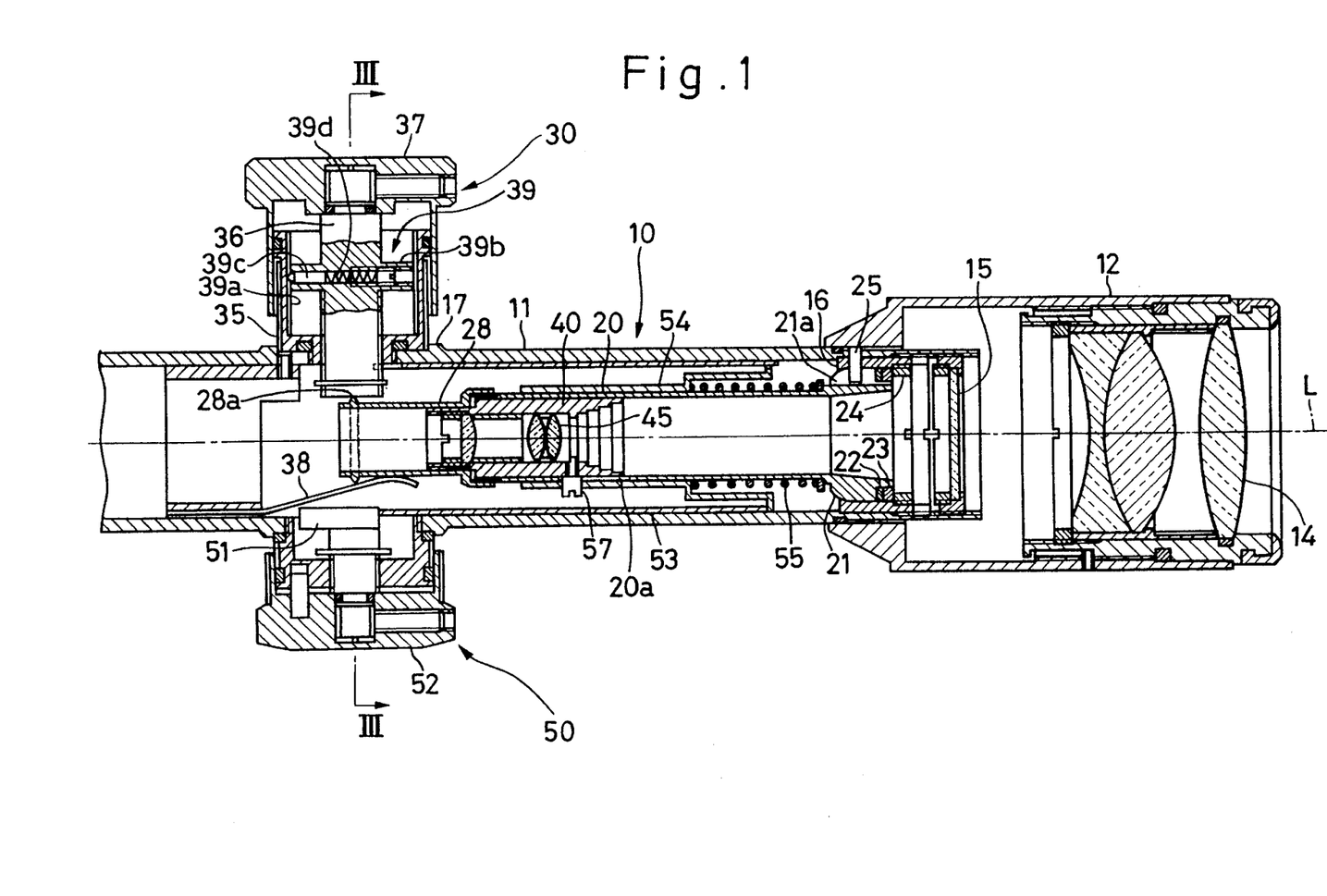
FIG. 1 is a sectional plan view showing an overall sight scope, only excepting a front end portion, according to one embodiment of the present invention.
Figure 2:
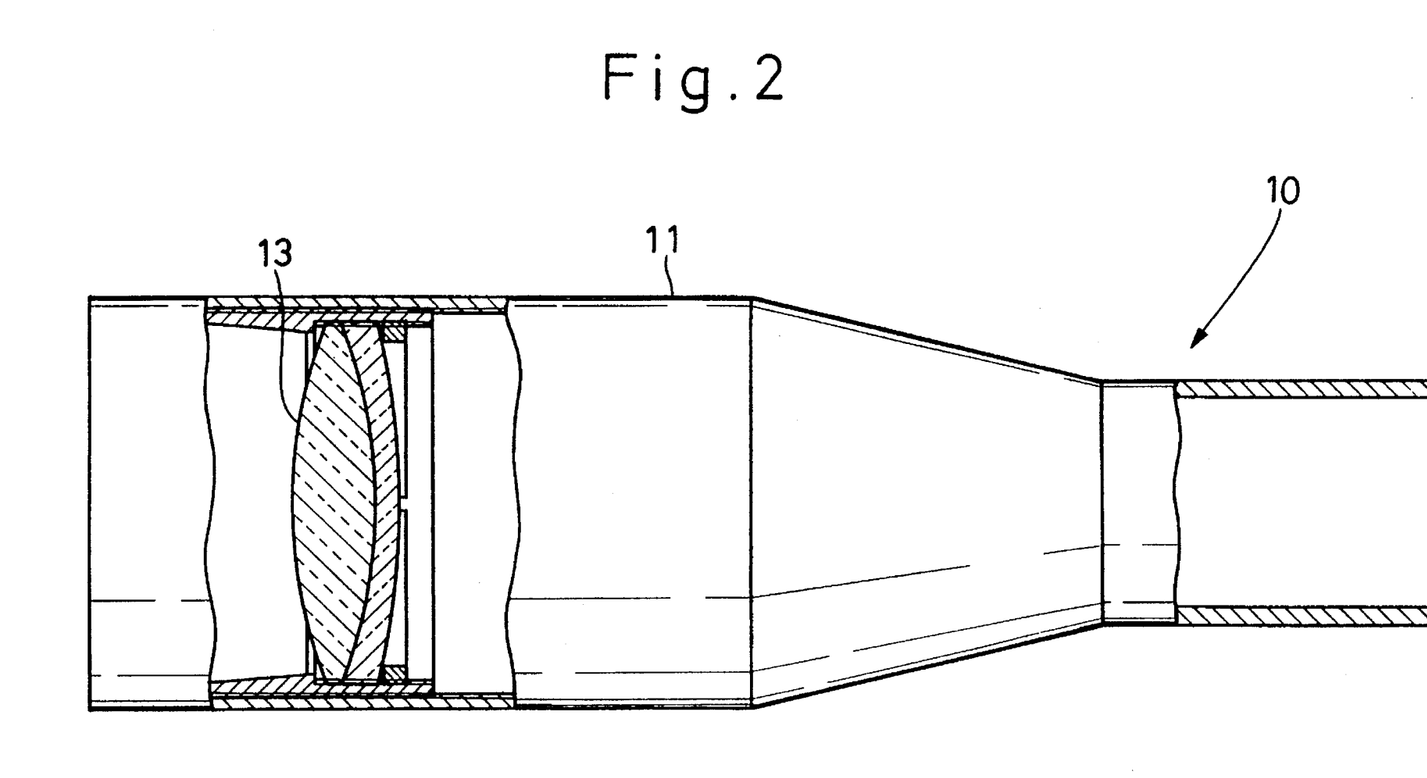
FIG. 2 is a plan view, partly in section, of the front end portion of the sight scope of FIG. 1.

The present invention will now be described with reference to the accompanying drawings. As shown in FIG. 1, the sight scope includes a sleeve-like scope body 10. This scope body 10 includes a main sleeve 11 having a front end portion of an enlarged diameter, and an eyepiece sleeve 12 secured to a rear end portion of the main sleeve 11. The axis of the main sleeve 11 is indicated by a one-dot chain line L in FIG. 1. An objective lens system 13 (see FIG. 2) is disposed within the front end of the main sleeve 11, and an eyepiece lens system 14 is disposed within an eyepiece sleeve 12. On the rear end of the main sleeve 11, a reticle 15 is mounted in front of the eyepiece lens system 14.

A sleeve-like support seat 16 is secured to the rear end portion of the main sleeve 11 at a location in front of the reticle 15. An inner peripheral surface of the front end portion of this support seat 16 is spherical. Within the main sleeve 11, a circular-cylindrical erect sleeve 20 is received. A rear end portion of the erect sleeve 20 is defined as a joint 21 having a spherical outer peripheral surface. When this joint 21 is received in the support seat 16, the erect sleeve 20 is turnably supported (namely, inclinably supported with respect to the axis L of the scope body 10) for turning about the joint 21. An annular cut is formed in a rear end portion of the joint 21. A wave washer 22 and a rubber O-ring 23 are received in this annular cut. A pressing ring 24 is threadedly engaged with an inner peripheral surface of the rear end portion of the support seat 16. This pressing ring 24 is adapted to lock the joint 21 through the wave washer 22 and the O-ring 23 so that the erect sleeve 20 is prohibited from moving backwardly. A pin 25 is allowed to extend radially all the way through the main sleeve 11 and the support seat 16, and received in a slit 21a which is formed in the joint 21 of the erect sleeve 20 and allowed to extend axially. Owing to the foregoing arrangement, the erect sleeve 20 is prohibited from turning about the axis L.

A movable sleeve 40 is axially slideably received within the front end portion of the erect sleeve 20. An erect lens system 45 is disposed within the movable sleeve 40. An inverted image of the target, which is provided by the objective lens system 13, can be provided as an erect image by the erect lens system 45.

The movable sleeve 40 is adjusted in position by a position adjusting mechanism 50. By this, a focusing is made. The position adjusting mechanism 50 includes an eccentric cam 51 which is rotated by a control handle 52, and a follower sleeve 53 which is slidably received in the main sleeve 11 and whose distal end is in contact with the eccentric cam 51. The follower sleeve 53 is slid axially in response to a rotational movement of the eccentric cam 51. The position adjusting mechanism 50 further includes an association sleeve 54 slidably supported on an outer periphery of the erect sleeve 20. This association sleeve 54 is biased forwardly by a coil spring 55. A rear end of the association sleeve 54 is in abutment with a rear end of the follower sleeve 53. Owing to this arrangement, the association sleeve 54 is slid axially in response to the movement of the follower sleeve 53. The association sleeve 54 is connected to the movable sleeve 40 through a pin 57. This pin 57 is received in a slit 20a formed in the erect sleeve 20 and extending axially, such that the pin 57 can move axially.

With the position adjusting mechanism 50 thus constructed, when the eccentric cam 51 is turned, the follower sleeve 53, the association sleeve 54 and the movable sleeve 40 are slid axially altogether. By this, the position of the erect lens system 45 is adjusted and eventually, a focusing is made.

Figure 3:
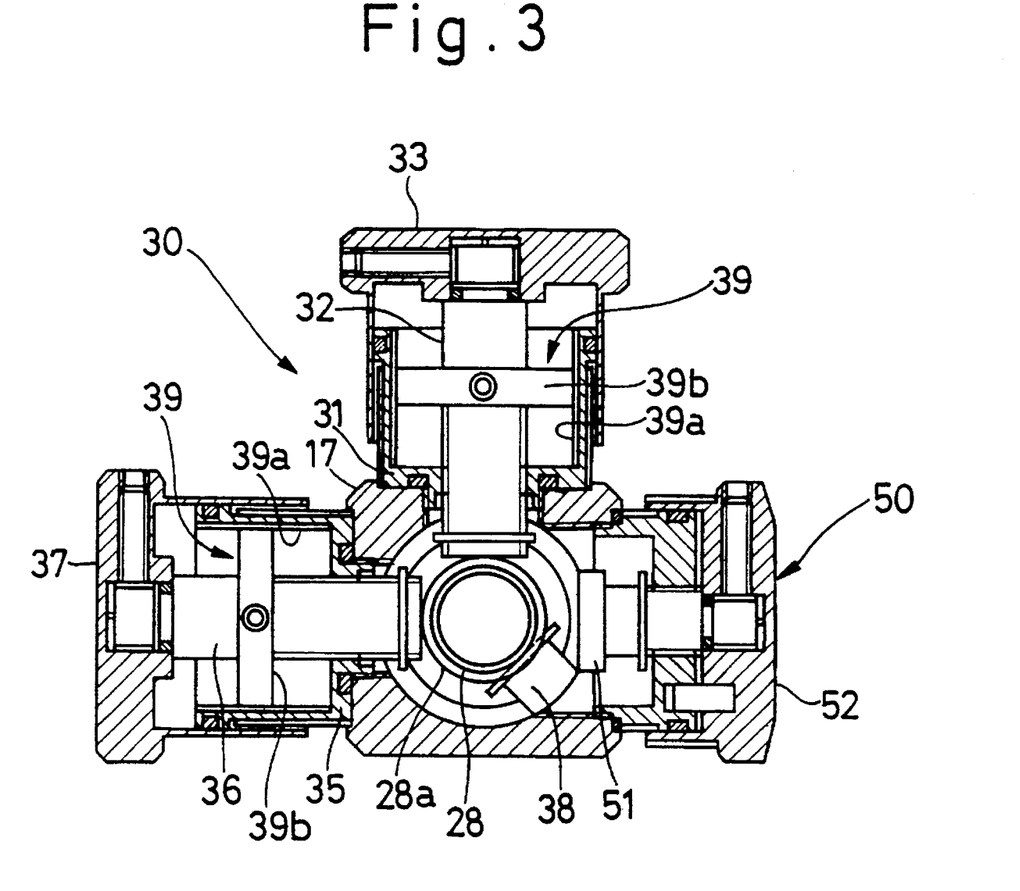
FIG. 3 is a sectional view taken on line III—III of FIG. 1.

Next, an inclination adjusting mechanism 30 for inclining the erect sleeve 20 with respect to the axis L of the scope body 10 will be described in detail. As best shown in FIG. 3, the inclination adjusting mechanism 30 is mounted on a mounting portion 17 having a square configuration in section, formed on an intermediate portion of the main sleeve 11. A lower end portion of a support sleeve 31 serving as a part of the scope body 10 is threadedly engaged with an upper part of the mounting portion 17. A shaft 32 (adjusting member) extending vertically and radially of the scope body 10 is threadedly engaged with the lower end portion of the support sleeve 31. An internal end of the shaft 32 is faced with an internal space of the mounting portion 17. A control handle 33 is secured to an external end of the shaft 32. When this control handle 33 is turned, the shaft 32 is moved vertically while turning together with the control handle 33.

Similarly, a right end portion of the support sleeve 35 serving as a part of the scope body 10 is threadedly engaged with a left part of the mounting portion 17, when viewed from the objective side. Another shaft 36 (adjusting member) extending horizontally and radially of the scope body 10 is threadedly engaged with the right end portion of the support sleeve 35. An internal end of this shaft 36 is faced with the internal space of the mounting portion 17. A control handle 37 is secured to an external end of the shaft 36. When this control handle 37 is turned, the shaft 36 is moved horizontally (rightwardly and leftwardly) while turning together with the control handle 37.

Rotation-stop mechanisms 39 for stopping the rotation of the shafts 32, 36 are each provided in the support sleeves 31, 35. As best shown in FIG. 1, each rotation-stop mechanism 39 includes a serrated portion 39a formed in an inner peripheral surface of the support sleeve 31, 35, a disk portion 39b disposed on the shaft 32, 36, a pin 39c received in the disk portion 39b, and a coil spring 39d for biasing the pin 39c. A distal end of the pin 39c is engaged with the serrated portion 39a so that the shafts 32, 36 are prohibited from rotation. When a torque of a predetermined level or more is applied to each of the control handles 33, 37, the pin 39c is retreated against the coil spring 39c and therefore, the shafts 32, 36 can be rotated.

As shown in FIGS. 1 and 3, an auxiliary sleeve 28 provided as a part of the erect sleeve 20 is threadedly secured to an outer periphery of the front end of the erect sleeve 20. A front end portion of this auxiliary sleeve 28 is in pressure contact with internal end faces of the shafts 32 and 36 under the effect of a plate spring 38 one end of which is secured to an inner periphery of the main sleeve 11. Therefore, when the control handle 33 is turned, the front end portion of the erect sleeve 20 is moved upwardly and downwardly, thereby the vertical inclination of the erect sleeve 20 can be adjusted, depending on a distance from the shooter to the target. Also, when the control handle 37 is turned, the front end portion of the erect sleeve 20 is moved rightwardly and leftwardly, thereby the horizontal inclination of the erect sleeve 20 can be adjusted with respect to wind, etc.

Next, the characteristic portion of the present invention will be described. A circular ring-like projection 28a is formed on a distal end portion of the auxiliary sleeve 28. As typically shown in FIGS. 4A and 4B, the projection 28a is tapered when viewed in a direction perpendicular to an axis L of the scope body 10. In other words, the projection 28a has a triangular configuration in section. The top portion of the projection 28a is in point-contact with the inner end faces of the shafts 32, 36.

Figure 4A:
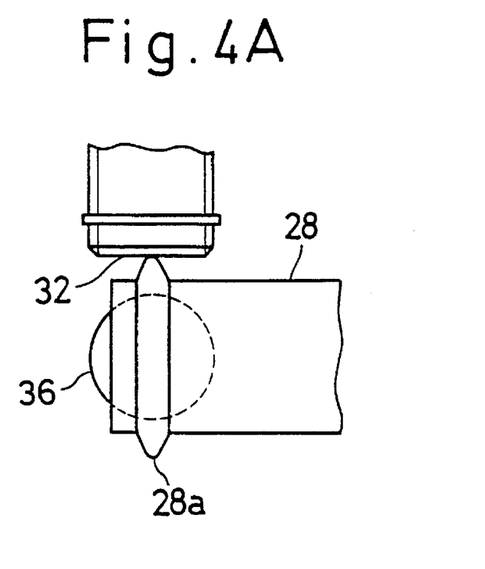
FIG. 4A is an enlarged side view of an important portion of an inclination adjusting mechanism used in the above sight scope.
Figure 4B:
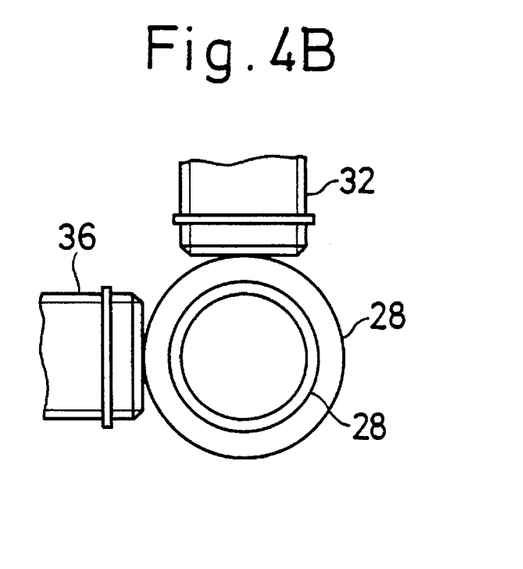
FIG. 4B is an enlarged front view of the important portion of the inclination adjusting mechanism.

As described above, the auxiliary sleeve 28 of the erect sleeve 20 is in point-contact with the inner end faces of the shafts 32, 36 through the projection 28a. The position of the point-contact is not varied substantially. An adjustment of a vertical inclination of the erect sleeve 20 will now be described. The position of the contact-point between the projection 28a and the scope body 10 is not varied in the direction of the axis L of the scope body 10 irrespective of the upward/downward inclination of the erect sleeve 20 with respect to the axis L of the scope body 10. Accordingly, the relation between an amount of vertical movement of the shaft 32 (an amount of a rotational operation of the control handle 33) and an inclination angle of the erect sleeve 20 can be made equal in the upward and downward inclination directions of the erect sleeve 20 and eventually, an angle of inclination of the erect sleeve 20 can be adjusted correctly.

Similarly, the position of the contact-point between the projection 28a and the inner end face of the shaft 36 is not varied in the direction of the axis L of the scope body 10 irrespective of the rightward/leftward horizontal inclination of the erect sleeve 20 with respect to the axis L of the scope body 10. As a consequence, the relation between the amount of horizontal movement of the shaft 36 (an amount of rotational operation of the control handle 37) and the angle of inclination of the erect sleeve 20 can be made equal in the rightward and leftward inclination directions of the erect sleeve 20, and eventually, the rightward and leftward inclination angles of the erect sleeve 20 can be adjusted correctly.

The shafts 32, 36 are perpendicular to each other. The inner end faces of the shafts 32, 36 are flat surfaces perpendicular to their own axes, respectively. Thus, the upward/downward inclination angle adjustment and the rightward/leftward inclination angle adjustment do not interfere with each other. For example, when the upward/downward inclination of the erect sleeve 20 is varied by the vertical movement of the shaft 32, the projection 28a of the erect sleeve 20 slips on the inner end face of the shaft 36. Consequently, the position of the contact-point between the projection 28a and the inner end face of the shaft 36 is varied in a direction perpendicular to the axis L of the scope body 10. However, since the inner end face of the shaft 36 is vertical, the position of the contact-point is not varied horizontally. Thus, the rightward/leftward inclinations of the erect sleeve 20 are not varied. Similarly, when the rightward/leftward inclination adjustment of the erect sleeve 20 is made, the upward/downward inclination angle of the erect sleeve 20 is not varied.

Figure 5A:
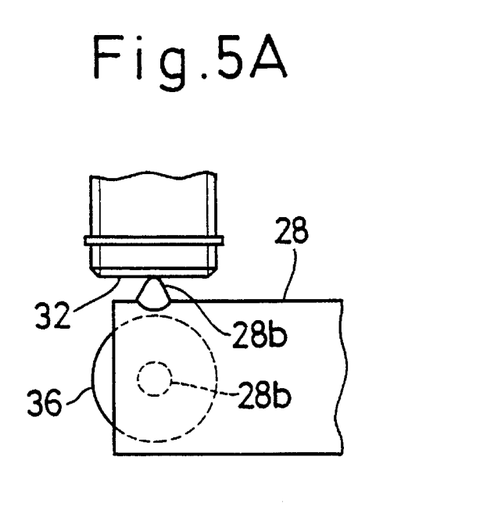
FIG. 5A is an enlarged side view of an important portion of an inclination adjusting mechanism according to a modified embodiment.
Figure 5B:
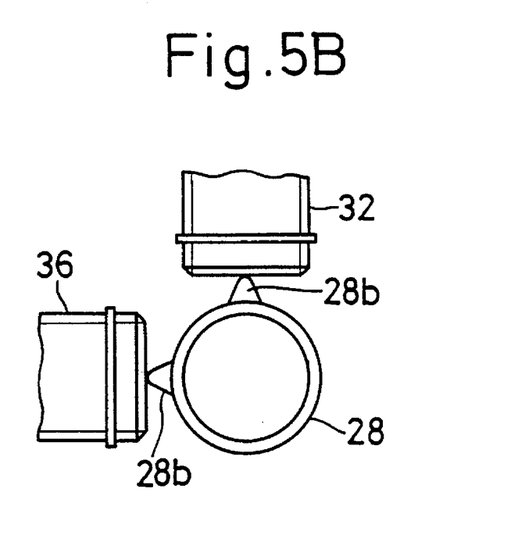
FIG. 5B is an enlarged front view of the important portion of the inclination adjusting mechanism of FIG. 5A.

In a modified embodiment shown in FIGS. 5A and 5B, two conical projections 28b are formed on a distal end portion of the auxiliary sleeve 28 of the erect sleeve 20. The conical projections 28b are away from each other by 90 degrees in the circumferential direction of the auxiliary sleeve 28. The projections 28b are brought into point-contact with the flat distal end faces of shafts 32 and 36 of the inclination adjusting mechanism.

Figure 6A:
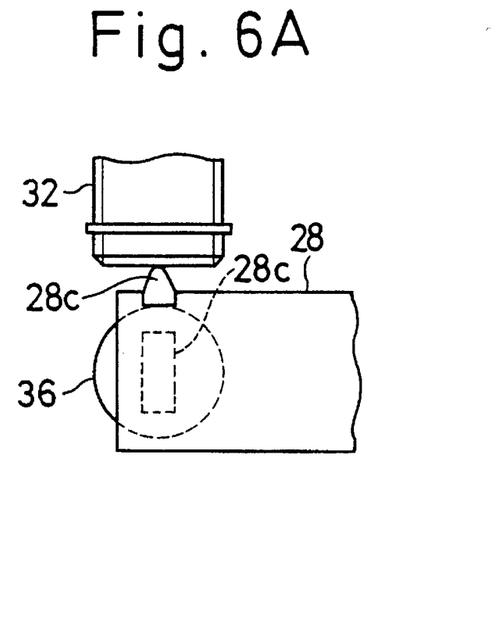
FIG. 6A is an enlarged side view of an important portion of an inclination adjusting mechanism according to another modified embodiment.
Figure 6B:
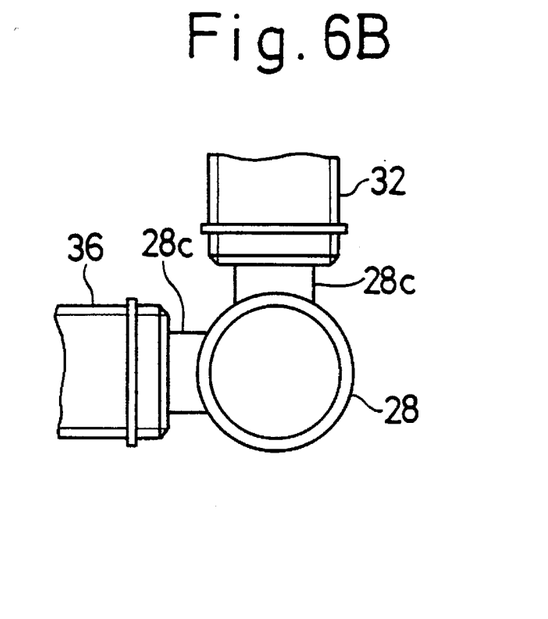
FIG. 6B is an enlarged front view of the important portion of the inclination adjusting mechanism of FIG. 6A.

In another modified embodiment shown in FIGS. 6A and 6B, two projections 28c each having a triangular configuration in section and extending in a circumferential direction of the auxiliary sleeve 28 are formed on a distal end portion of the auxiliary sleeve 28. The top portions of the projections 28c are parallel respectively with the flat distal end faces of the shafts 32, 36 and allowed to linearly extend in a direction perpendicular to the axis of the scope body 10. In this embodiment, the projections 28c are in line-contact with the inner end faces of the shafts 32, 36, respectively.

Figure 7A:
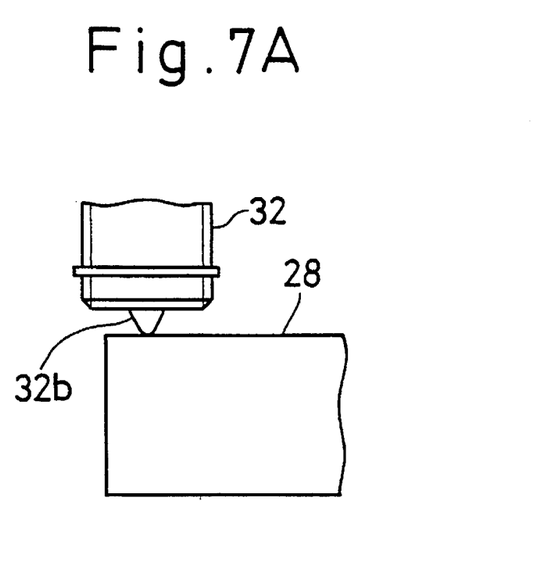
FIG. 7A is an enlarged side view of an important portion of an inclination adjusting mechanism according to a further modified embodiment.
Figure 7B:
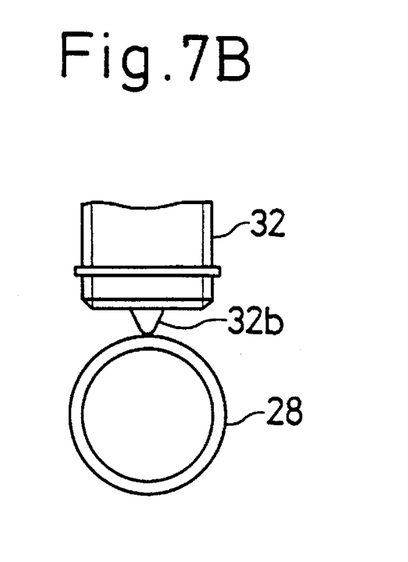
FIG. 7B is an enlarged front view of the important portion of the inclination adjusting mechanism of FIG. 7A.

In a further modified embodiment shown in FIGS. 7A and 7B, the inclination adjusting mechanism has only the function for inclining the erect sleeve upwardly and downwardly. A conical projection 32b located on the axis of the shaft 32 is formed at the center of the inner end face of the shaft 32. This projection 32b is in point-contact with a cylindrical outer peripheral surface of a distal end portion of the auxiliary sleeve 28 of the erect sleeve.

The projection or projections formed on the erect sleeve or shaft may be semi-spherical or may be a projection or projections having a semi-circular configuration in section and extending in a circumferential direction of the erect sleeve.

What is claimed is:

1. A sight scope comprising:

(a) a sleeve-like scope body having an objective lens system on a front end portion thereof and an eyepiece lens system on a rear end portion thereof;

(b) an erect sleeve received in said scope body, an erect lens system being supported within said erect sleeve, one end portion of said erect sleeve being pivotably supported by said scope body; and (c) inclination adjusting means for inclining said erect sleeve with respect to an axis of said scope body by moving the other end portion of said erect sleeve in a direction perpendicular to the axis of said scope body, said inclination adjusting means including an adjusting member and a spring, said adjusting member extending through said scope body in such a manner as to be perpendicular to the axis of said scope body and being threadedly engaged with said scope body, said spring being adapted to bias the other end portion of said erect sleeve so as to be brought into abutment with an inner end face of said adjusting member, thereby the inclination of said erect sleeve being determined by said adjusting member;

(d) one of the inner end face of said adjusting member and an outer peripheral surface of the other end portion of said erect sleeve being provided as a first surface and the other, as a second surface, a projection being formed on said first surface, said projection being tapered when viewed in a direction perpendicular to the axis of said scope body, a distal portion of said projection being in contact with said second surface.

2. A sight scope according to claim 1, wherein the outer peripheral surface of the other end portion of said erect sleeve is provided as said first surface and has said projection, the inner end face of said adjusting member being provided as said second surface, the inner end face of said adjusting member being a flat surface perpendicular to an axis of said adjusting member.

3. A sight scope according to claim 2, wherein said projection extends in a circumferential direction of said erect sleeve and is in point-contact with the inner end face of said adjusting member.

4. A sight scope according to claim 3, wherein said adjusting member extends vertically through said scope body and said adjusting means includes another adjusting member extending horizontally through said scope body, said projection being of a ring-like configuration and in point-contact with the inner end faces of said adjusting members.

5. A sight scope according to claim 2, wherein said projection is of a conical configuration.

6. A sight scope according to claim 2, wherein the distal portion of said projection is linear, said distal portion being perpendicular to the axis of said scope body and parallel to the inner end face of said adjusting member, the distal portion of said projection being in line-contact with the inner end face of said adjusting member.

7. A sight scope according to claim 1, wherein the inner end face of said adjusting member is provided as said first surface and the outer peripheral surface of the other end portion of said erect sleeve is provided as said second surface, said projection being formed on an axis of said adjusting member in the center of the inner end face of said adjusting member and being of a conical configuration.

8. A sight scope comprising:

(a) a scope body having an axis;

(b) a sleeve received in said scope body, said sleeve supporting at least one lens, said sleeve having one end portion pivotably supported by said scope body and an other end portion;

(c) an adjusting member extending through said scope body perpendicularly to the axis of said scope body and being threadedly engaged with said scope body;

(d) a spring adapted to bias the other end portion of said sleeve so as to be brought into abutment with an inner end face of said adjusting member;

(e) one of the inner end face of said adjusting member and an outer peripheral surface of the other end portion of said sleeve being provided as a first surface and the other, as a second surface, a projection being formed on said first surface, said projection being tapered toward a distal portion of the projection when viewed in a direction perpendicular to the axis of said scope body, the distal portion being in contact with said second surface.

9. A sight scope according to claim 8, wherein the outer peripheral surface of the other end portion of said erect sleeve is provided as said first surface and has said projection, the inner end face of said adjusting member being provided as said second surface, the inner end face of said adjusting member being a flat surface perpendicular to an axis of said adjusting member.

10. A sight scope according to claim 9, wherein said projection extends in a circumferential direction of said erect sleeve and is in point-contact with the inner end face of said adjusting member.

11. A sight scope according to claim 10, wherein said adjusting member extends vertically through said scope body, said sight scope further comprising another adjusting member having an inner end face, said another adjusting member extending horizontally through said scope body, said projection being of a ring-like configuration and in point-contact with the inner end faces of said adjusting members.

12. A sight scope according to claim 9, wherein said projection is of a conical configuration.

13. A sight scope according to claim 9, wherein the distal portion of said projection is linear, said distal portion being perpendicular to the axis of said scope body and parallel to the inner end face of said adjusting member, the distal portion of said projection being in line-contact with the inner end face of said adjusting member.

14. A sight scope according to claim 8, wherein the inner end face of said adjusting member is provided as said first surface and the outer peripheral surface of the other end portion of said erect sleeve is provided as said second surface, said projection being formed on an axis of said adjusting member in the center of the inner end face of said adjusting member and being of a conical configuration.

* * * * *